A. THORSBY.
LATHE OR TURNING MACHINE.
APPLICATION FILED MAY 14, 1909.
973,587.
Patented Oct. 25, 1910.
4 SHEETS—SHEET 1.
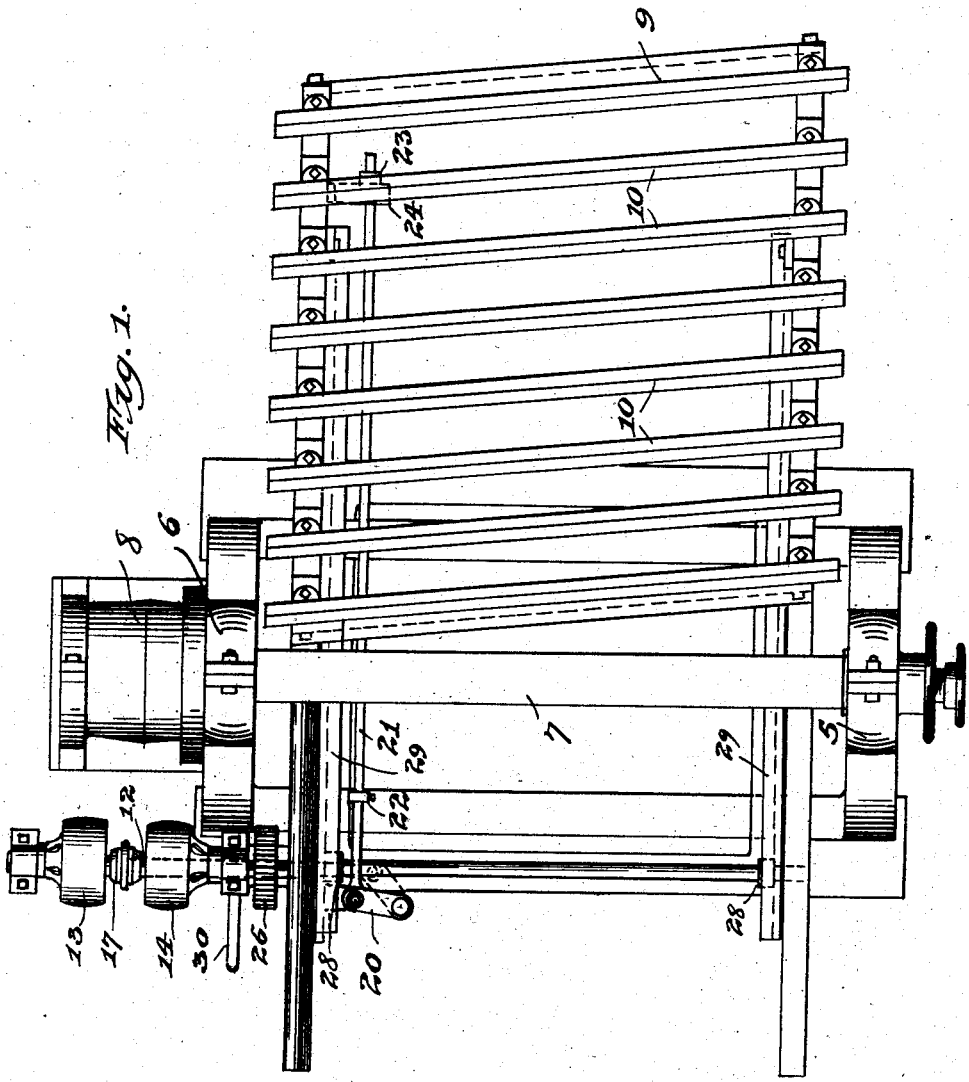

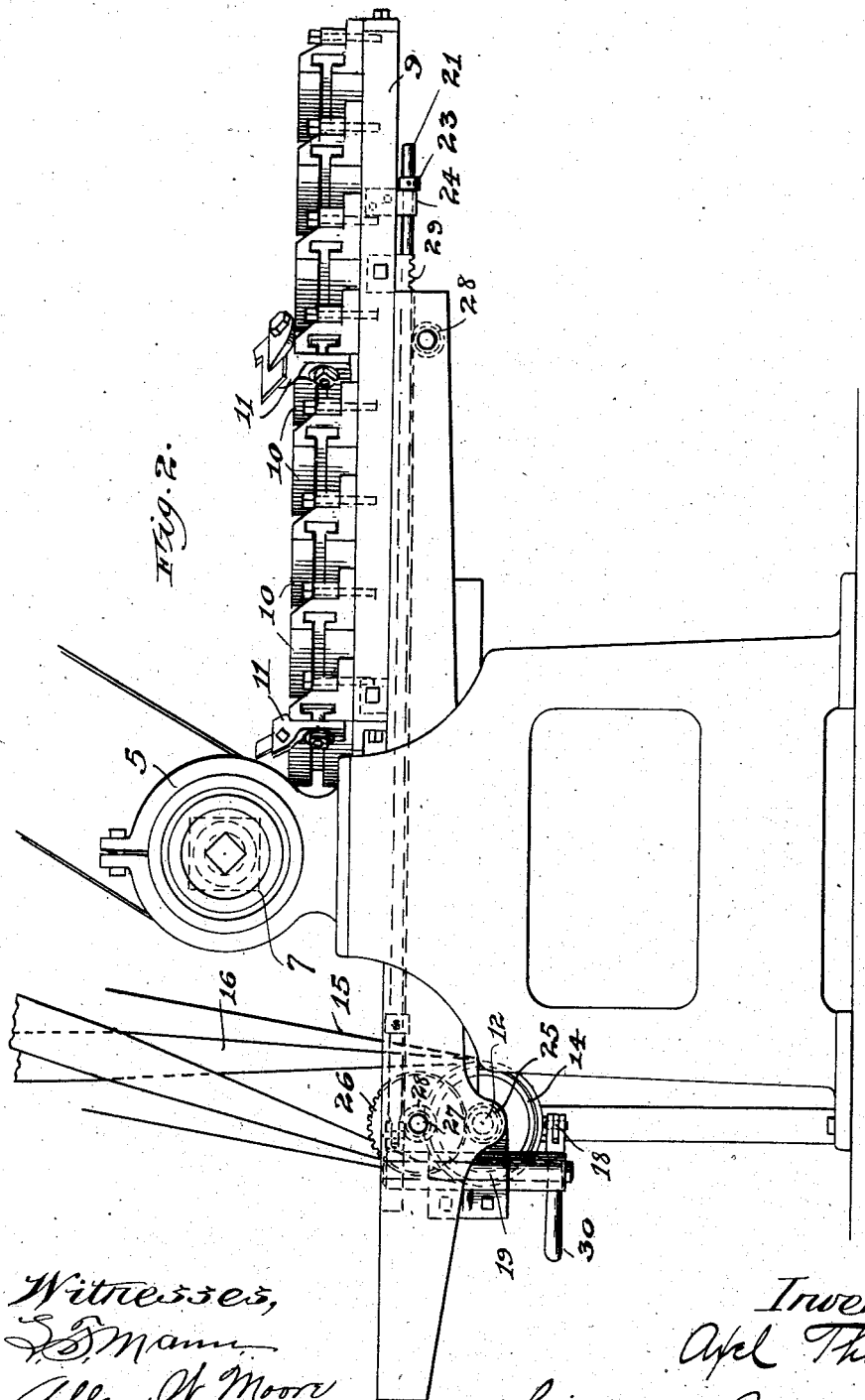

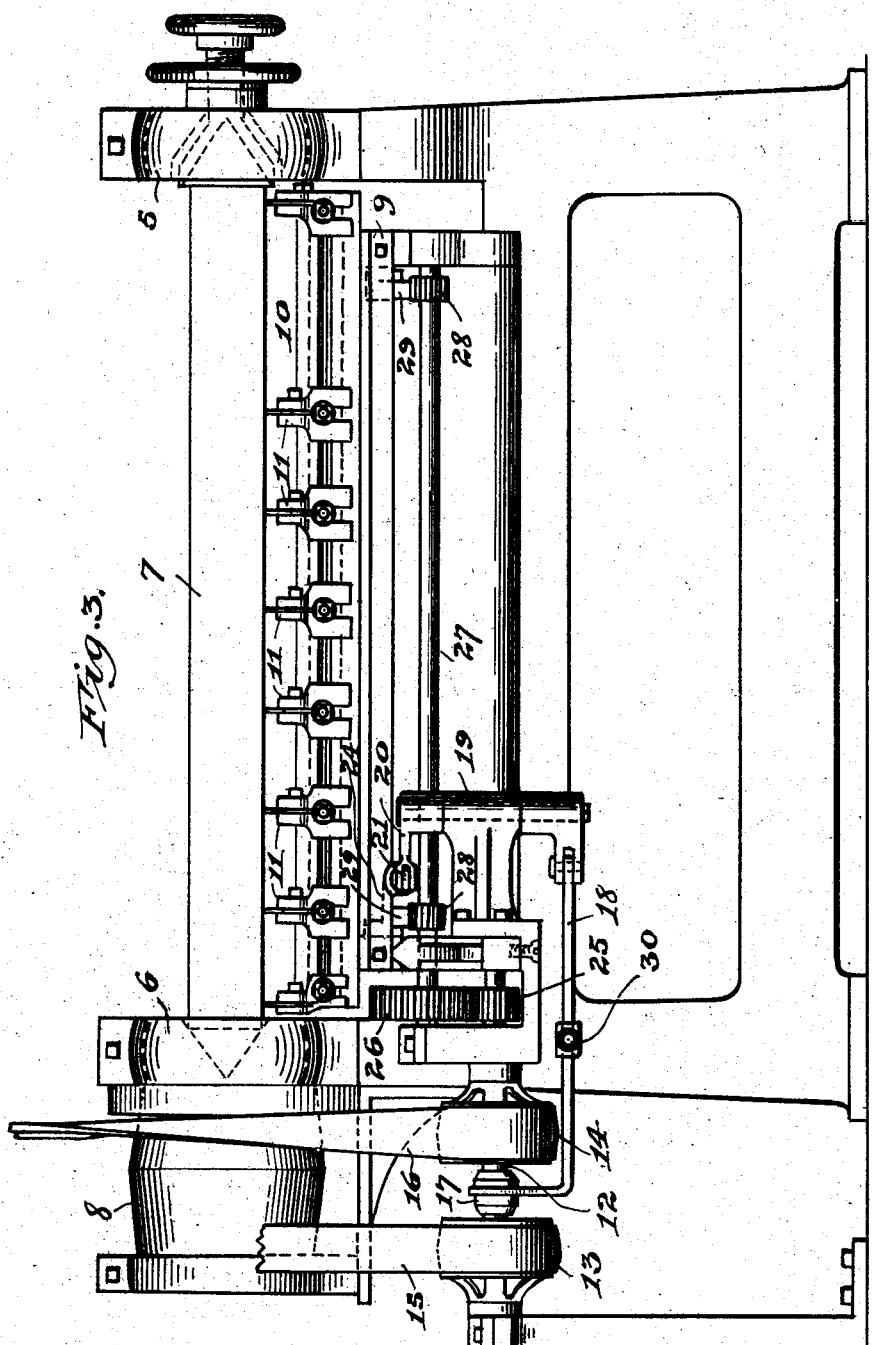

A. THORSBY.
LATHE OR TURNING MACHINE.
APPLICATION FILED MAY 14, 1909.
973,587.
Patented Oct. 25, 1910.
4 SHEETS—SHEET 4.
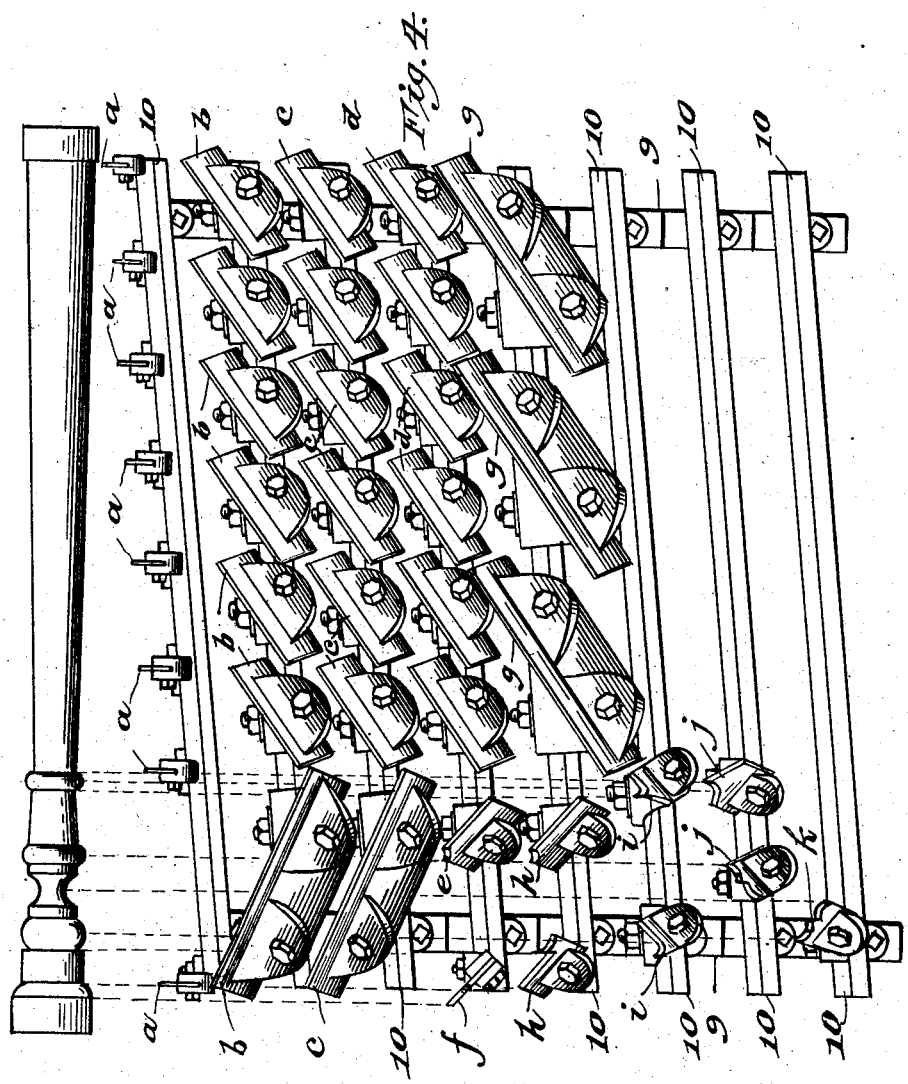

UNITED STATES PATENT OFFICE.

AXEL THORSBY, OF BELOIT, WISCONSIN, ASSIGNOR TO THE BERLIN MACHINE WORKS, OF BELOIT, WISCONSIN, A CORPORATION OF WISCONSIN.

LATHE OR TURNING-MACHINE.

973,587.     Specification of Letters Patent.     Patented Oct. 25, 1910.

Application filed May 14, 1909. Serial No. 496,089.

*To all whom it may concern:*

Be it known that I, AXEL THORSBY, a citizen of the United States, residing at Beloit, in the county of Rock and State of Wisconsin, have invented certain new and useful Improvements in Lathes or Turning-Machines, of which the following is a specification.

This invention relates to a machine for turning wood or other material to provide regular or irregular round forms, and has been applied to the turning of porch posts of wood. The machine is particularly useful for this latter purpose, and is well adapted to the turning of woods which splinter easily and therefore require care in the turning operation.

Generally stated, the machine comprises a revoluble work holder or chuck and a traveling or reciprocating tool carrier.

Work of this kind has heretofore been performed in various ways, and porch posts have been roughly turned by automatic machines, but in difficult woods and for finished work hand turning is extensively practiced.

It is the object of this invention to provide a machine which will turn out work equal in quality to the best hand work, and much more rapidly and therefore economically. To this end I employ a series of traveling or reciprocating tool holders which are caused to traverse beneath or adjacent to the stock, the latter being rotated in cutting engagement with the several tools as they are presented to the work. The tools are arranged in series or sets, the first series or set being preferably scoring knives which may act simultaneously on all the parts of the work, or successively. Following the scoring knives a second tool carrier carries a series of roughing knives, and following the primary roughing knives a secondary set may be employed to carry the work forward to the point where the finishing knives are brought into action. Of these latter any number of sets may be employed, and successive tool holders may carry special tools, such as beading knives and the like, until finally the completed post is formed by the successive action of the several knives, and this at a single traverse of the tool carrier beneath or in coöperative relation with the stock.

In the preferred construction each set of tools is mounted upon the tool holder arranged obliquely to the axis of the stock so as to present the tools successively to different parts of the work, and each tool is also preferably mounted obliquely to its holder so as to bring the cutting edge of each tool progressively into contact with the work.

My invention is shown in a simple form in the accompanying drawings, in which—

Figure 1 is a plan view; Fig. 2 is a side elevation; Fig. 3 is a front elevation, parts being omitted from all of the figures; and Fig. 4 is a diagrammatic view showing the arrangement of the full complement of tools with reference to the work.

In the drawings, 5 represents the head stock and 6 the tail stock of a chuck for holding the work 7, which may be a stick of timber of rectangular form. The chuck bearing the stock will be driven from the pulley 8.

9 represents a traveling or reciprocating table on which are mounted a series of carriers 10 in the form of grooved bars, and in which are mounted the tool holders 11. The table may be reciprocated by any suitable gearing. I have indicated a simple form of gearing or driving mechanism comprising a driving shaft 12, bearing pulleys 13, 14 both loose on the shaft and driven in opposite directions by belts 15, 16, as determined by the position of a friction clutch actuating member or sliding sleeve 17 carried on the shift rod 18, the latter being mounted in a bracket 19 on the frame and having an arm thereof 20 carrying a rod 21 provided with collars 22, 23, the latter engaging a stop 24 on the table 9 so as to automatically throw the clutch out of engagement at each end of the stroke. The table is driven from the pinion 25 on the driving shaft through the gear 26 on the driven shaft 27, the latter having pinions 28 engaging racks 29 on the table 9. The shift rod 18 may be manually operated by the handle 30 so as to throw the clutch into engagement after the finished work has been removed and a new piece of stock secured in place in the chuck.

As above indicated and as clearly appears from the drawings, particularly Sheet 4, the several carriers are mounted obliquely to the axis of the work, and the tools are arranged obliquely to the axis of the carriers. The first set of tools may be scoring knives $a$, the second set preliminary roughing knives $b$, the third set $c$ are also roughing knives to carry the work a little farther than the preliminary set; the next set $d$ may be knives completing the roughing out of the pattern, and upon the same holder may be mounted special knives, as $e$, $f$, for executing special parts of the work. The set of knives $g$ complete the plain portion of the body of the work, while the sets of knives $h$, $i$, $j$, and $k$ complete the beaded portions of the work. The dotted lines of Fig. 4 leading from the knives to the work indicate those portions of the latter upon which the former operate.

Of course, the particular description above given is intended to relate only to the specific type of work mentioned, and the form, number, position and sequence of the tools may be changed or varied, and will necessarily be so changed or varied with different kinds of work. It will be understood that in a machine of the character above described all of the tools employed in hand operation may be mounted and applied in this machine and in the same sequence to produce a like result, but with a very great saving in time.

In this machine the work revolves and the tool is relatively stationary, having a very slow traverse relative to the speed of rotation of the work, and I have found that in this way difficult woods, such as red woods, firs, and the like, may be successfully turned without splintering or chipping and with a high degree of finish.

It will be obvious from the foregoing that my invention is not confined to any specific form of chuck, gearing, or specific construction of tool carriers or tools, or any specific arrangement of the latter, and also that with permissible modifications and adaptations this machine can be used for operating upon other materials than wood, such as hard rubber, bone, stone, and various other natural or composite substances.

I claim:

1. In a machine of the character described, the combination of a rotary work holder, a reciprocatory table, a plurality of tool carriers on said table arranged in straight lines obliquely to the axis of the work, and a plurality of tools mounted on each of said tool carriers, the cutting edges of said tools being disposed obliquely to the axis of the carriers, said table and tool carriers supporting said tools and presenting them successively to the work, whereby the pattern upon the latter is progressively formed during movement of the table, substantially as described.

2. In a machine of the character described, the combination of a rotary work holder, a reciprocatory table, a plurality of straight bars obliquely mounted on and extending across said table, a plurality of tool holders mounted on said bars, and a plurality of tools carried by said tool holders, the cutting edges of said tools being disposed obliquely to the axis of the work, so that the rear end of a tool will follow the forward end of an adjacent tool on the same carrier and the oblique bars being spaced apart a sufficient distance so that said tools will be successively presented to the work, substantially as described.

AXEL THORSBY.

Witnesses:
L. A. Ross,
H. H. Sherman.